(12) United States Patent
Eulitz

(10) Patent No.: US 11,581,605 B2
(45) Date of Patent: Feb. 14, 2023

(54) BATTERY HOUSING FOR A DRIVE BATTERY

(71) Applicant: KAUTEX TEXTRON GMBH & CO. KG, Bonn (DE)

(72) Inventor: Dirk Eulitz, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 215 days.

(21) Appl. No.: 16/760,981

(22) PCT Filed: Nov. 2, 2018

(86) PCT No.: PCT/EP2018/079998
§ 371 (c)(1),
(2) Date: May 1, 2020

(87) PCT Pub. No.: WO2019/086600
PCT Pub. Date: May 9, 2019

(65) Prior Publication Data
US 2020/0313130 A1   Oct. 1, 2020

(30) Foreign Application Priority Data

Nov. 3, 2017  (DE) ................. 10 2017 125 750.0

(51) Int. Cl.
*H01M 4/02* (2006.01)
*H01M 50/20* (2021.01)
(Continued)

(52) U.S. Cl.
CPC ............... *H01M 50/20* (2021.01); *B60K 1/04* (2013.01); *H01M 10/613* (2015.04);
(Continued)

(58) Field of Classification Search
CPC ....................................................... H01M 4/02
See application file for complete search history.

(56) References Cited

U.S. PATENT DOCUMENTS

| 5,387,477 A * | 2/1995 | Cheiky | ............... H01M 6/5038 |
| | | | 429/415 |
| 5,510,207 A | 4/1996 | Grivel et al. | |

(Continued)

FOREIGN PATENT DOCUMENTS

| CN | 103443957 | 12/2013 |
| CN | 104953061 | 9/2015 |

(Continued)

OTHER PUBLICATIONS

Office Action from related Japanese Appln. No. 2020-524612, dated Jun. 21, 2021. English translation attached.

(Continued)

*Primary Examiner* — Jacob B Marks
(74) *Attorney, Agent, or Firm* — Grossman, Tucker, Perreault & Pfleger, PLLC

(57) ABSTRACT

A battery housing for a drive battery, comprising at least one housing shell, wherein the housing shell is formed at least partially or fully from a thermoplastic, wherein the housing shell has a receiving region for insertion of a drive battery, wherein the housing shell has a wall, wherein the wall has a two-layer or multi-layer sandwich structure, wherein at least a first layer of the sandwich structure, at least in some sections, is distanced from a second layer of the sandwich structure such that a wall cavity is formed between the first layer and the second layer, and wherein the wall cavity is designed to store a cooling medium.

12 Claims, 3 Drawing Sheets

(51) Int. Cl.
*H01M 10/613* (2014.01)
*H01M 10/625* (2014.01)
*H01M 10/6551* (2014.01)
*H01M 10/6556* (2014.01)
*H01M 10/6567* (2014.01)
*H01M 10/6569* (2014.01)
*B60K 1/04* (2019.01)
*B60K 6/28* (2007.10)
*B60K 1/00* (2006.01)

(52) U.S. Cl.
CPC ..... *H01M 10/625* (2015.04); *H01M 10/6551* (2015.04); *H01M 10/6556* (2015.04); *H01M 10/6567* (2015.04); *H01M 10/6569* (2015.04); *B60K 6/28* (2013.01); *B60K 2001/005* (2013.01); *B60Y 2200/91* (2013.01); *B60Y 2200/92* (2013.01); *B60Y 2304/00* (2013.01); *B60Y 2306/05* (2013.01); *B60Y 2400/112* (2013.01); *B60Y 2410/10* (2013.01); *H01M 2220/20* (2013.01)

(56) References Cited

U.S. PATENT DOCUMENTS

| | | | |
|---|---|---|---|
| 5,569,552 | A | 10/1996 | Rao et al. |
| 5,641,589 | A | 6/1997 | Grivel et al. |
| 2013/0004808 | A1 | 1/2013 | Tschismar |
| 2013/0280575 | A1 | 10/2013 | Obrist et al. |
| 2014/0338998 | A1* | 11/2014 | Fujii .......... B60K 1/04 180/68.5 |
| 2016/0190664 | A1 | 6/2016 | Frohnmayer et al. |
| 2016/0243929 | A1 | 8/2016 | Karsch |
| 2017/0025655 | A1 | 1/2017 | Klimek et al. |
| 2017/0194609 | A1 | 7/2017 | Curtis et al. |
| 2017/0271727 | A1* | 9/2017 | Ito .......... B60L 50/60 |

FOREIGN PATENT DOCUMENTS

| | | | |
|---|---|---|---|
| CN | 104955668 | | 9/2015 |
| CN | 106251916 | | 12/2016 |
| CN | 106941140 | | 7/2017 |
| DE | 102009047695 | | 6/2011 |
| DE | 10-2010055614 | * | 6/2012 |
| DE | 102010055614 | | 6/2012 |
| DE | 102012012663 | | 12/2013 |
| DE | 102015220354 | | 4/2017 |
| DE | 10-2017000263 | * | 6/2017 |
| EP | 2955780 | | 12/2015 |
| JP | 2012-84446 | | 4/2012 |
| JP | 2016-511509 | | 4/2016 |
| JP | 2016-91951 | | 5/2016 |
| JP | 2017-27938 | | 2/2017 |

OTHER PUBLICATIONS

International Search Report, dated Jan. 4, 2019, received in corresponding PCT Application No. PCT/EP2018/079998.
English translation of the International Preliminary Report on Patentability, dated May 14, 2020, received in corresponding PCT Application No. PCT/EP2018/079998.
English translation of Organoblech Definition, https://de.wikipedia.org/wiki/Organoblech, downloaded Jul. 13, 2022.
Organoblech Definition, https://de.wikipedia.org/wiki/Organoblech, downloaded Jul. 13, 2022.

* cited by examiner

BATTERY HOUSING FOR A DRIVE BATTERY

FIELD

The present invention relates to a battery housing for a drive battery.

BACKGROUND

Battery housings for drive batteries serve for reliably enclosing a drive battery, for example in a motor vehicle. In this case, the drive battery should be accommodated in the battery housing so as to be crash-resistant and protected from fire for a specified minimum period of time. In this manner, escape of chemicals which are environmentally hazardous and harmful to health in the event of a crash or fire should be avoided. Battery housings for drive batteries of motor vehicles therefore have to pass standardized fire tests, such as are also known for example for fuel tanks of motor vehicles.

In order to comply both with the requirements in terms of crash resistance and the minimum requirements in terms of fire resistance, known battery housings for accommodating drive batteries are usually made from welded or pressed steel sheet or cast aluminum. In such case, it is a disadvantage that such housings made of metallic material are comparatively heavy and therefore adversely affect the range of electrically powered vehicles.

SUMMARY

Given this background, the invention is based on the technical problem of devising a lightweight battery housing for a drive battery which in particular is crash-resistant and is protected from fire for a specified minimum period of time.

A battery housing for a drive battery is specified, comprising at least one housing shell, wherein the housing shell is formed at least partially or fully from a thermoplastic, wherein the housing shell has a receiving region for insertion of a drive battery, wherein the housing shell has a wall, wherein the wall has a two-layer or multi-layer sandwich structure, wherein at least a first layer of the sandwich structure, at least in some sections, is distanced from a second layer of the sandwich structure such that a wall cavity is formed between the first layer and the second layer, and wherein the wall cavity is designed to store and/or distribute a cooling medium.

The sandwich structure accordingly forms with the integrated wall cavity both a structure for crash-resistant enclosing of a drive battery and a volume for storing and/or distributing cooling medium.

Due to the fact that in operation a cooling medium for cooling the drive battery accommodated in the battery housing is stored within the wall, the fire resistance of the battery housing can be increased. Thus the cooling medium stored in the wall, in the event of a fire, also serves to cool the wall which is exposed to a fire.

The terms "drive battery" and "traction battery" are used synonymously in the present case. A drive battery or traction battery may further be referred to as a high-performance storage battery, which is used in for example in purely electrically powered vehicles or hybrid vehicles.

The cooling medium may be a refrigerant or a coolant. For example, according to one configuration of the battery housing a water/glycol mixture may be stored as coolant within the sandwich structure, i.e. in the wall cavity of the sandwich structure. According to alternative configurations, a refrigerant may be stored in the wall cavity. The wall of the housing shell is accordingly constructed in the manner of a cavity profile.

According to a further configuration of the battery housing, provision is made for a portion of the wall cavity to be an expansion volume for the cooling medium. The cooling medium, which may be in particular a coolant or a refrigerant, may expand during cooling operation owing to the introduction of heat from the drive battery, which is to be cooled, and/or changes at least partially by a phase change from the liquid into the gaseous phase. The expansion volume provides the necessary compensating volume for such operations.

Alternatively or additionally, provision may be made for an expansion volume to be integrated in a cover which closes the housing shell, the expansion volume of the cover being in a fluid connection with the wall cavity of the housing shell. In this case, a cavity integrated within the wall of the cover is in a fluid connection with the wall cavity of the housing shell, for example by way of a hose connection, pipe connection, flanged connection or the like.

Provision may be made for the housing shell to be closable or closed with a conventional metal cover, which may for example be formed in part or fully of a steel or aluminum material.

In order to permit as compact a construction of a cooling means as possible, a pump and/or a compressor for delivering the cooling medium may be integrated, at least in some sections, in the sandwich structure. Accordingly, a cooling means for cooling a drive battery may be integrated in part or fully in the battery housing.

For example, a pump and/or a compressor may, at least in some sections, be encompassed on two sides by the first layer of the sandwich structure and by the second layer of the sandwich structure. In particular, a pump and/or a compressor may be fully encompassed by the first layer of the sandwich structure and the second layer of the sandwich structure. In this manner, the pump and/or the compressor are reliably protected from environmental influences. It goes without saying that at least one power supply line for supplying the pump and/or the compressor may be conducted through the wall.

The first layer and the second layer of the sandwich structure may, according to a further configuration of the battery housing, in some sections, be connected directly together. For example, the first and the second layer may, in some sections, be integrally bonded with each other, in particular by welding and/or bonding. Thus substantially linear and/or substantially punctiform connections may be formed between the first layer and the second layer in order to provide a crash-resistant, reinforced sandwich structure.

Alternatively or additionally, provision may be made for at least one reinforcing element or a plurality of reinforcing elements to extend between the first layer and the second layer, which elements are designed to stiffen the sandwich structure. Such a stiffening element is for example a strut extending between the first and the second layer. The reinforcing element may have a circular, ovular or polygonal cross section.

A reinforcing element may be connected by a first end to the first layer and be connected by a second end to the second layer. The reinforcing element may in particular be welded to the first and the second layer.

Consequently, an arrangement of local connection points may be provided between the first layer and the second layer and/or reinforcing elements in order to guarantee crash-resistant accommodation of a drive battery or traction battery in the battery housing.

Provision may be made for at least one reinforcing element or a plurality of reinforcing elements to be of a multi-component configuration, and to contain at least two materials. Thus the reinforcing elements or at least one reinforcing element may be formed at a first end from a first material which can be welded to a material of the first layer, and at a second end distanced from the first end may be formed from a second material which can be welded to the second layer. In particular, a respective reinforcing element may contain materials which can be welded in each case in the same way to the associated materials of the first layer and of the second layer in order to achieve a reliable welded connection.

A central section formed between the ends of the reinforcing element may, compared with its end connection regions, be formed from a stiffer or more flexible material in order to guarantee sufficient flexibility and/or stiffness of the housing shell depending on the loading condition.

Alternatively or additionally, provision may be made for at least one reinforcing element or a plurality of reinforcing elements to have a predetermined breaking point. The predetermined breaking point allows the corresponding reinforcing element to fail or to absorb energy in the event of an overload, so that damage to the drive battery which is to be enclosed from parts of the battery housing is avoided.

The battery housing may have cooling fins for dissipating heat to the surroundings on the housing shell or a cover which closes the housing shell. With the aid of the cooling fins, a surface enlargement can be brought about in known manner, so that a heat transfer from the cooling medium towards the surroundings can take place.

If cooling fins for dissipating heat are formed for example on the wall of the housing shell and/or are formed on a cover which closes the housing shell, a cooler may be integrated fully in the battery housing.

Alternatively or additionally, the wall cavity can be placed in a fluid connection with an external cooler which is separate from the battery housing. To this end, two or more interfaces for coupling a cooler inlet and a cooler outlet may be integrated in the wall of the housing shell and/or the cover in order to form a cooling circuit.

The housing shell can be produced inexpensively and efficiently by blow molding. Blow molding permits a one-layer or multi-layer wall construction in a reliable manner, it being possible in addition for reinforcing elements to be applied during the blow molding process in the shaping heat.

Alternatively, the housing shell may have been produced in part by injection molding. Injection molding permits a multi-layer wall construction in an inexpensive manner.

The first layer of the sandwich structure may be of multi-layer construction. Thus the first layer of the wall structure may for its part in turn consist of a plurality of layers of thermoplastic. This applies equally for the second layer, which may likewise, taken by itself, in turn be of multi-layer construction. Thus a plurality of materials can be combined in order to meet the requirements relating to stiffness, flexibility, pollutant emission and fire protection.

Provision may be made for at least one of the layers to have a barrier layer which serves as a diffusion barrier for hydrocarbons. In such case, this may for example be a layer of EVOH (ethylene/vinyl alcohol copolymer).

At least one of the layers may consist of polyamide (PA), polypropylene (PP), polyphthalamide (PPA), polyphenylene sulfide (PPS), polyketone (PK) or polyethylene (PE), or contain polyamide (PA), polypropylene (PP), polyphthalamide (PPA), polyphenylene sulfide (PPS), polyketone (PK) or polyethylene (PE).

At least one of the layers may consist of a fiber-reinforced plastics material or contain fiber-reinforced plastics material. Due to the fiber-reinforced plastics material, a lightweight and at the same time rigid sandwich material can be provided in a simple manner.

At least one of the layers may have been shaped by thermoforming. Thus, for example, one layer of the sandwich material or the entire sandwich material can be brought per se into the intended form by heating and subsequent shaping, in order to define a receiving region for insertion of the traction battery or drive battery.

At least one of the layers may contain an organo sheet or consist of an organo sheet.

Alternatively or additionally, the housing shell may be clad with organo sheet on an outer side distanced from the receiving region. Thus the fire resistance of the housing shell can be increased and in addition reinforcement of the housing shell obtained.

Provision may be made for at least one of the layers to contain an electrically conductive material in order to comply with current EMC standards, for example from the automobile sector.

Provision may be made for one or more retaining clamps or retaining tabs, which contain an organo sheet, to be provided for fastening the battery housing to a vehicle body. The organo sheet may in this case be curved in the manner of a hook and have at least one through-hole in order to permit the housing shell to be screwed to a vehicle body. The retaining clamps or retaining tabs may be incorporated in the sandwich structure in an integrally bonded manner, in particular by welding, encapsulation or bonding.

BRIEF DESCRIPTION OF THE DRAWINGS

Below, the invention will be described in greater detail with reference to drawings which illustrate embodiments. These show, in each case schematically.

DETAILED DESCRIPTION

Figure 1:
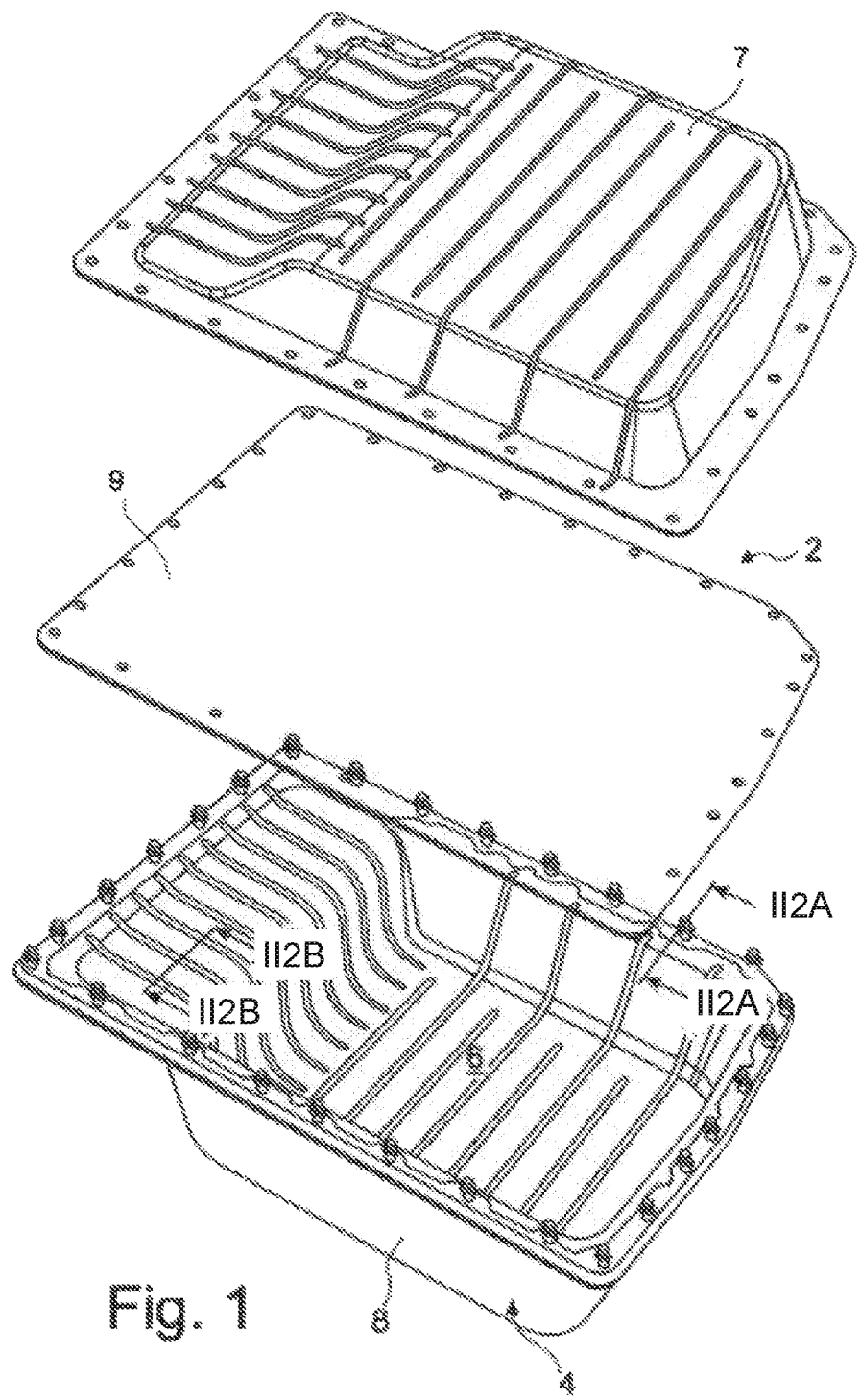
FIG. 1 is a battery housing according to the invention for a drive battery.

FIG. 1 shows a battery housing 2 according to the invention for a drive battery. The battery housing 2 has a housing shell 4 which can be closed with a cover 7. An intermediate plate 9 in the present case is shown as transparent and is merely indicated in a position lifted off from the housing shell 4, in order to ensure clarity of the drawing.

The housing shell 4 and the cover 7 in the present case are formed substantially fully of a thermoplastic. The housing shell 4 has a receiving region 6 for insertion of a drive battery. Above the intermediate plate 9, battery modules of the drive battery can likewise be accommodated.

Figure 2A:
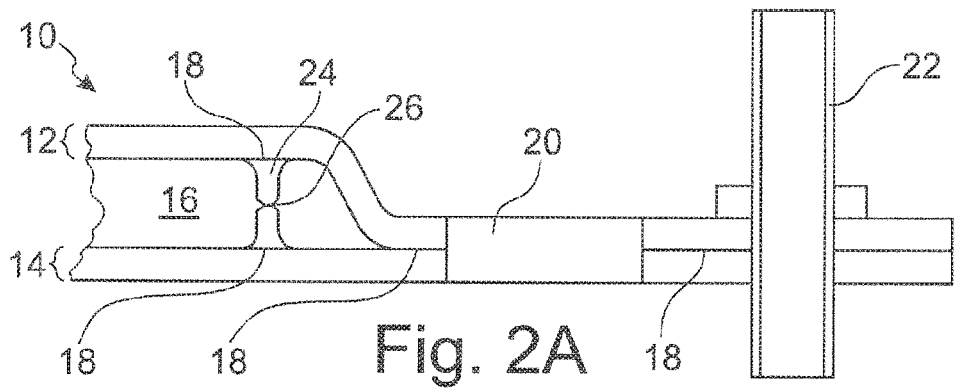
FIG. 2 is a first wall cross section of the housing shell of FIG. 1.
FIG. 2B is a second wall cross section of the housing shell of FIG. 1.
Figure 2B:
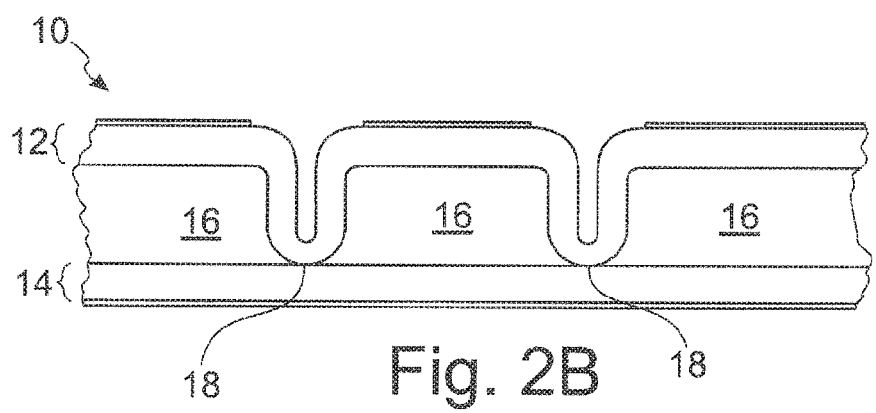

The housing shell 4 has a wall 8, the wall 8 having a multilayer sandwich structure 10 (FIG. 2A; FIG. 2B). A first layer 12 of the sandwich structure 10, at least in some sections, is distanced from a second layer 14 of the sandwich structure 10 such that a wall cavity 16 is formed between the first layer 12 and the second layer 14. The wall cavity 16 is designed for storing a cooling medium.

FIGS. 2A and 2B show schematically the construction of the sandwich structure 10. It goes without saying that the spaces 16 illustrated in FIG. 2B are in a fluid connection and as a whole form the wall cavity 16 for storing cooling medium. One portion of the wall cavity 16 is an expansion volume for the cooling medium.

In the regions 18, the first layer 12 and the second layer 14 are locally welded together. The sandwich structure 10 has openings 20 and is penetrated by connecting elements 22.

Between the first layer 12 and the second layer 14, there are arranged reinforcing elements 24 which are designed to stiffen the sandwich structure 10.

Such a reinforcing element 24 is of a two-component construction and contains at least two materials which are welded in the same way to the first layer 12 and the second layer 14. The reinforcing element 24 has a predetermined breaking point 26.

Figure 3:
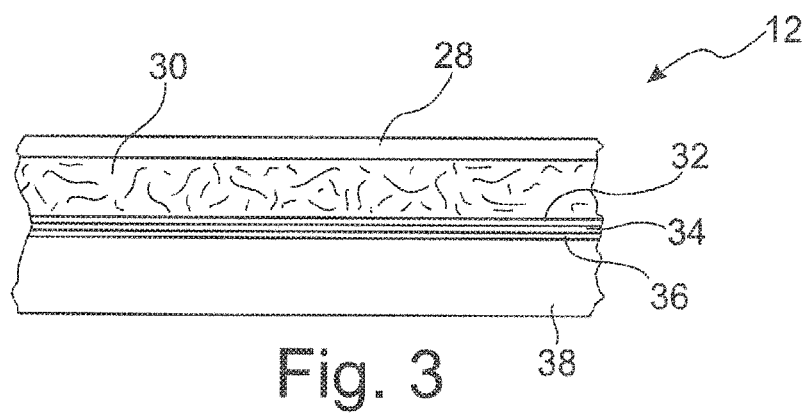
FIG. 3 is a layered construction of a first layer of the housing shell of FIG. 2B.

As shown in FIG. 3 as an example for the first layer 12 of FIG. 2B, each of the layers 12, 14 may for its part in turn be of multi-layer construction in the manner of a sandwich structure. Thus the first layer 12 in the present case has an outer layer in the form of an organo sheet 28, which covers a plastics material 30 provided with conductive filler. The plastics material 30 provided with conductive filler may be connected by means of a coupling agent layer 32 to a barrier layer 34 which is connected by a further coupling agent layer 36 to a further plastics-material layer 38.

Figure 4:
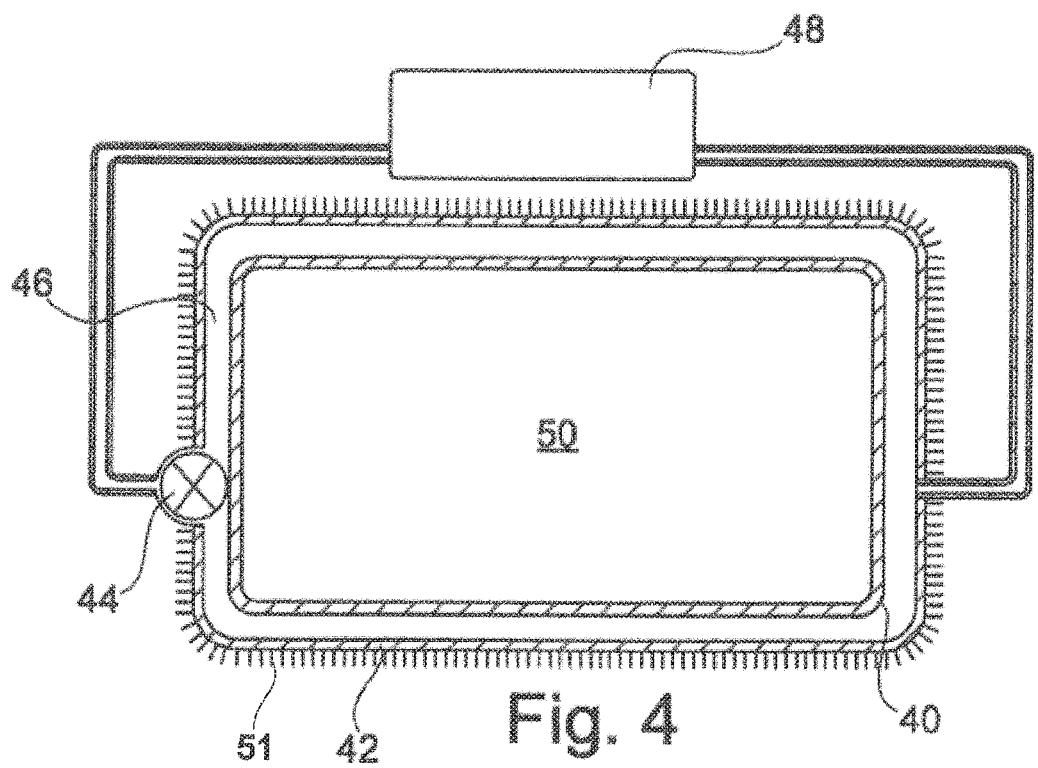
FIG. 4 is a further battery housing according to the invention with a cooler.

FIG. 4 shows a further liquid container 40 according to the invention which has a pump 44 embedded in a sandwich structure 42. By way of the pump 44, a wall cavity 46 of the container 40 is in a fluid connection with a cooler 48, so that a cooling medium stored in the wall cavity 46 can be circulated via the cooler. The battery housing 40 has a receiving region 50 which is designed for receiving a drive battery or traction battery. On the container 40 there are provided cooling fins 51 for dissipating heat to the surroundings.

Figure 5:
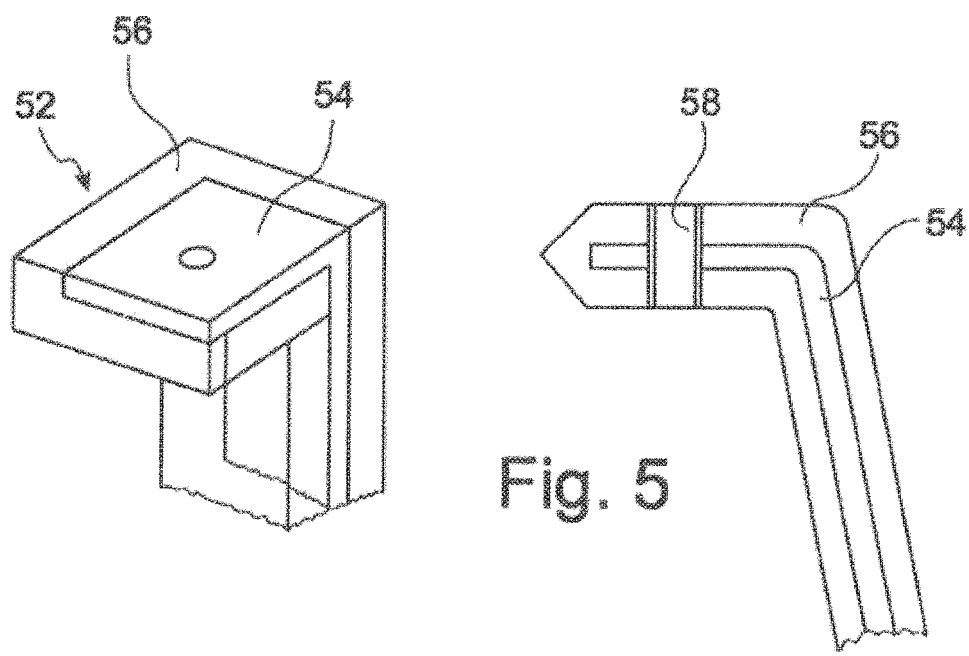
FIG. 5 is a perspective view of and a cross section through a retaining clamp for a battery housing according to the invention.

FIG. 5 shows a retaining clamp 52 which has an organo sheet 54 encapsulated with plastics material 56, in order to screw a battery housing 2 or 40 to a vehicle body. To this end, the retaining clamp 52 may be penetrated by a sleeve 58. The plastics material 56 may for example be polypropylene or polyamide. The holding element 54 may be able to be welded to the battery housing 2 or 40 and thus be connected to a sandwich structure 10 or 42 in an integrally bonded manner.

REFERENCE NUMERALS 2 battery housing
4 housing shell
6 receiving region
7 cover
8 wall
9 intermediate plate
10 sandwich structure
12 first layer of the sandwich structure 10
14 second layer of the sandwich structure 10
16 wall cavity
18 regions
20 openings
22 connecting element
24 reinforcing element
26 predetermined breaking point
28 organo sheet
30 plastics material
32 coupling agent layer
34 barrier layer
36 coupling agent layer
38 plastics-material layer
40 liquid container
42 sandwich structure
44 pump
46 wall cavity
48 cooler
50 receiving region
51 cooling fins
52 retaining clamp
54 organo sheet
56 plastics material
58 sleeve

What is claimed is:

1. A battery housing for a drive battery, comprising at least one housing shell, wherein:
   the housing shell is formed at least partially or fully from a thermoplastic;
   the housing shell has a receiving region for insertion of a drive battery;
   the housing shell has a wall;
   the wall has a two-layer or multilayer sandwich structure;
   at least a first layer of the sandwich structure, at least in some sections, is distanced from a second layer of the sandwich structure such that a wall cavity is formed between the first layer and the second layer;
   the wall cavity is configured to store and/or distribute a cooling medium; and
   wherein a pump and/or a compressor are integrated, at least in some sections, in the sandwich structure.

2. The battery housing according to claim 1, wherein:
   a portion of the wall cavity is an expansion volume for the cooling medium; and/or
   an expansion volume is integrated in a cover which closes the housing shell, the expansion volume of the cover being in a fluid connection with the wall cavity of the housing shell.

3. The battery housing according to claim 1, wherein the first layer and the second layer, in some sections, are connected directly together.

4. The battery housing according to claim 1, wherein at least one reinforcing element or a plurality of reinforcing elements extend(s) between the first and second layer, which elements are designed to stiffen the sandwich structure.

5. The battery housing according to claim 4, wherein:
   at least one reinforcing element or a plurality of reinforcing elements are of multicomponent configuration, and contain at least two materials.

6. The battery housing according to claim 1, wherein:
   cooling fins for dissipating heat to the surroundings are provided; and/or
   the wall cavity can be placed in a fluid connection with an external cooler by way of at least one connector.

7. The battery housing according to claim 1, wherein:
   the housing shell comprises a blow molded thermoplastic housing shell.

8. The battery housing according to claim 1, wherein:
   the first layer is a multilayer one; and/or the second layer is a multilayer one; and/or at least one of the layers has a barrier layer which serves as a diffusion barrier for hydrocarbons; and/or at least one of the layers contains polyamide, polypropylene, polyphthalamide, polyphenylene sulfide, polyketone or polyethylene, or consists of polyamide, polypropylene, polyphthalamide, polyphenylene sulfide, polyketone or polyethylene; and/or at least one of the layers is fiber-reinforced; and/or at least one of the layers has been shaped by thermoforming.

9. The battery housing according to claim 1, wherein:

at least one of the layers contains an organo sheet; and/or the housing shell is clad with organo sheet on an outer side distanced from the receiving region; and/or at least one of the layers contains an electrically conductive material; and/or one or more retaining clamps or retaining tabs, which contain an organo sheet, are provided for fastening to a vehicle body.

10. The battery housing according to claim 4, wherein:

at least one reinforcing element or a plurality of reinforcing elements has/have a predetermined breaking point.

11. The battery housing according to claim 1, wherein:

the housing shell comprises an injection molded thermoplastic housing shell.

12. The battery housing according to claim 1, wherein:

the wall is configured to separate the cooling medium from the drive battery whereby the cooling medium does not contact the drive battery.

\* \* \* \* \*